(12) United States Patent
Gupta et al.

(10) Patent No.: US 9,262,294 B2
(45) Date of Patent: Feb. 16, 2016

(54) SYSTEM AND METHOD FOR EVENT DETECTION AND CORRELATION FROM MOVING OBJECT SENSOR DATA

(75) Inventors: Chetan Kumar Gupta, San Mateo, CA (US); Abhay Mehta, Austin, TX (US); Song Wang, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 203 days.

(21) Appl. No.: 13/285,825

(22) Filed: Oct. 31, 2011

(65) Prior Publication Data

US 2013/0111012 A1    May 2, 2013

(51) Int. Cl.
*G06F 11/00* (2006.01)
*G06F 11/32* (2006.01)
*G06F 11/30* (2006.01)

(52) U.S. Cl.
CPC .......... *G06F 11/328* (2013.01); *G06F 11/3006* (2013.01); *G06F 11/3013* (2013.01); *G06F 11/3058* (2013.01)

(58) Field of Classification Search
CPC ............ H04L 43/04; G06N 3/08; G06N 5/02; G08G 1/00; G08G 1/166
See application file for complete search history.

(56) References Cited

U.S. PATENT DOCUMENTS

| | | | |
|---|---|---|---|
| 7,735,141 B1* | 6/2010 | Noel et al. ....................... | 726/25 |
| 8,442,800 B2* | 5/2013 | Lindstrom et al. ............. | 702/150 |
| 2007/0185646 A1* | 8/2007 | Neugebauer et al. ......... | 701/201 |
| 2008/0147668 A1* | 6/2008 | Weetman et al. .............. | 707/10 |
| 2010/0262613 A1 | 10/2010 | Gupta et al. | |
| 2011/0074596 A1* | 3/2011 | Frohlick et al. ............. | 340/691.1 |
| 2012/0072096 A1* | 3/2012 | Chapman et al. ............. | 701/118 |
| 2013/0096731 A1* | 4/2013 | Tamari et al. ..................... | 701/1 |

OTHER PUBLICATIONS

Nerieri, F. et al. e-Science and Grid Computing (2006). "Kalipy: A tool for Online Performance Analysis of workflows through Event Correlation". Retrieved Jun. 12, 2013. From <http://ieeexplore.ieee.org/stamp/stamp.jsp?tp=&arnumber=4030991>.*
Haridasan, Maya et al. 2010. "StarTrack Next Generation: A Scalable Infrastructure for Track-Based Applications". Retrieved on Sep. 22, 2014 from <https://www.usenix.org/legacy/event/osdi10/tech/>.*

* cited by examiner

*Primary Examiner* — Brian J Gillis
*Assistant Examiner* — Juan C Turriate Gastulo
(74) *Attorney, Agent, or Firm* — International IP Law Group, PLLC (57) ABSTRACT

An exemplary embodiment of the present techniques may detect and correlate events from moving object sensor data by receiving data from a sensor. The data received from the sensor may be mapped, and events may be detected based on the mapped sensor data. Events from the mapped sensor data may be correlated online.

22 Claims, 6 Drawing Sheets

SYSTEM AND METHOD FOR EVENT DETECTION AND CORRELATION FROM MOVING OBJECT SENSOR DATA

BACKGROUND

Event correlation is a technique for processing a stream of events occurring within a system. Event correlation may include discovering events, processing events, and extracting the most important events from the stream of events. Many systems that use operations management, such as transportation networks, data centers, and electrical grids, have various events that occur during operation. These events can be correlated for a greater understanding of the complete system.

Often, event correlation is implemented using a rule based technique to discover, process, and extract events. However, rule based event correlation may not discover events corresponding to unknown rules. As a result, some events may be missed in their entirety. Further, the systems are often dynamic, where the causes of the events change over time. Dynamic systems may also allow some events to be missed when using rule based event correlation.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

In an operations management scenario, such as traffic management or information technology operations, objects within the system may be fitted with sensors and other measuring devices that produce a constant stream of data. The constant stream of data may correspond to a large number of objects and include both raw data and triggered events. Human operators often man operations centers to monitor this streaming data. However, due to the sheer complexity and volume of the incoming data, operators often fail to detect events and react to the events after they have occurred. This may lead to downtime and loss of efficiency. Moreover, due to the complexity of the system, human operators are unable to optimize the normal running of the system, which may cause a suboptimal use of system resources.

Detecting and correlating events from moving object sensor data enables a human operator, or user, to quickly determine the status of the system. In embodiments, events may be detected in a robust manner using static and dynamic sensors to map moving objects. Further, online analysis of event correlation may be used to provide insight into the status of each moving object. Online analysis is a procedure that involves using an operator's bias in conjunction with the correlation discovery process. Online analysis is a useful tool where a human operator can interact with the system to retrieve more relative correlations at any given point of time. Through the present techniques, events may be discovered that would otherwise be missed by traditional rule based event correlation techniques.

Figure 1:
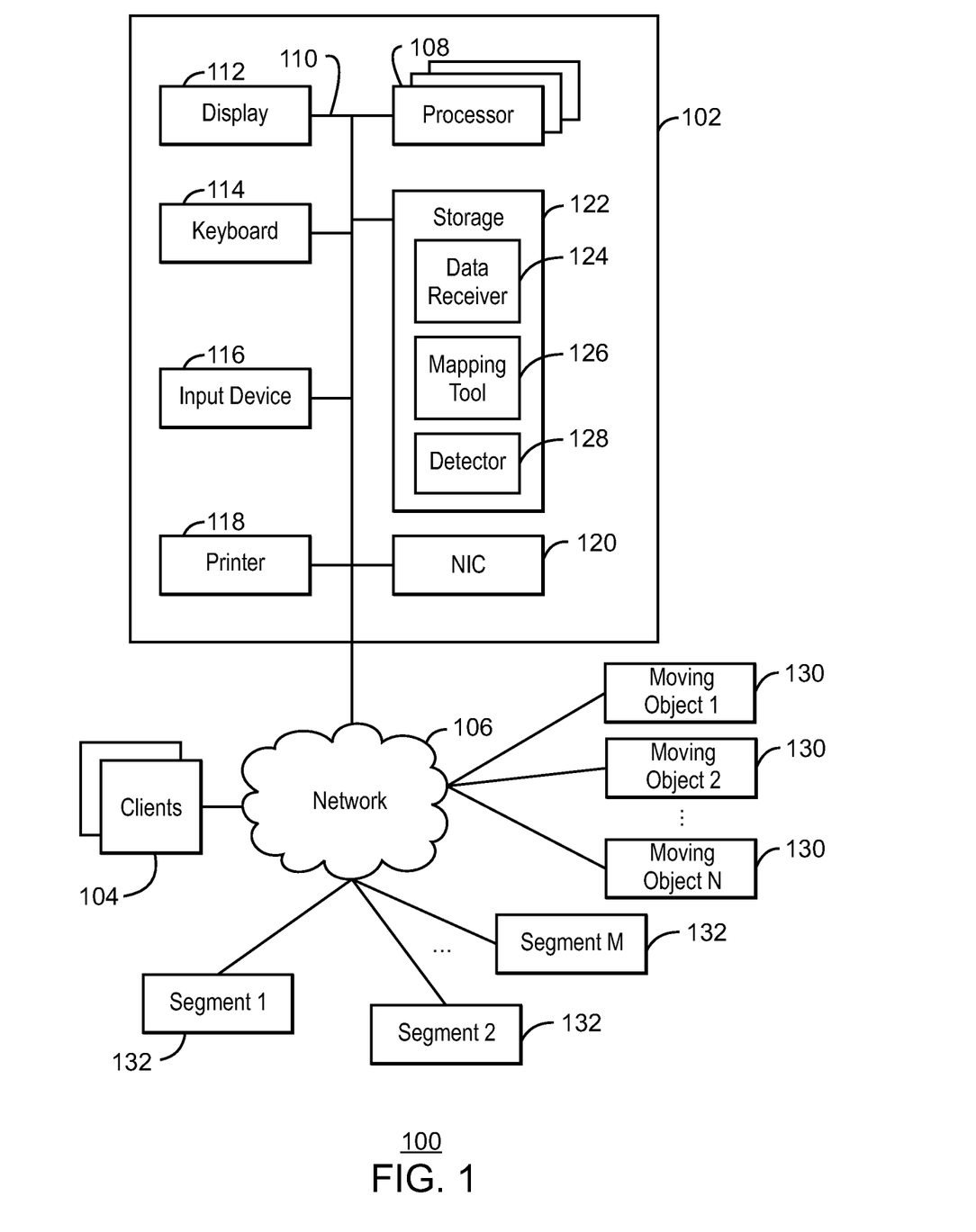
FIG. 1 is a block diagram of a system that may provide detection and correlation of events from moving object sensor data according to an embodiment of the present techniques.

FIG. 1 is a block diagram of a system that may provide detection and correlation of events from moving object sensor data according to an embodiment of the present techniques. The system is generally referred to by the reference number 100. Those of ordinary skill in the art will appreciate that the functional blocks and devices shown in FIG. 1 may comprise hardware elements including circuitry, software elements including computer code stored on a tangible, machine-readable medium, or a combination of both hardware and software elements. Additionally, the functional blocks and devices of the system 100 are but one example of functional blocks and devices that may be implemented in an embodiment. Those of ordinary skill in the art would readily be able to define specific functional blocks based on design considerations for a particular system.

The system 100 may include a server 102, and one or more client computers 104, in communication over a network 106. As illustrated in FIG. 1, the server 102 may include one or more processors 108 which may be connected through a bus 110 to a display 112, a keyboard 114, one or more input devices 116, and an output device, such as a printer 118. The input devices 116 may include devices such as a mouse or touch screen. The processors 108 may include a single core, multiple cores, or a cluster of cores in a cloud computing architecture. The server 102 may also be connected through the bus 110 to a network interface card (NIC) 120. The NIC 120 may connect the server 102 to the network 106.

The network 106 may be a local area network (LAN), a wide area network (WAN), or another network configuration. The network 106 may include routers, switches, modems, or any other kind of interface device used for interconnection. The network 106 may connect to several client computers 104. Through the network 106, several client computers 104 may connect to the server 102. The client computers 104 may be similarly structured as the server 102.

The server 102 may have other units operatively coupled to the processor 108 through the bus 110. These units may include tangible, machine-readable storage media, such as storage 122. The storage 122 may include any combinations of hard drives, read-only memory (ROM), random access memory (RAM), RAM drives, flash drives, optical drives, cache memory, and the like. Storage 122 may include a data receiver 124, a mapping tool 126, and a detector 128. The data receiver 124, mapping tool 126, and detector 128, may also be located on any of client computers 104. Further, data may be transferred between data receiver 124, mapping tool 126, and detector 128 using network 106. For example, the data receiver 124, mapping tool 126, and detector 128 may be located on the server 102 or different client computers 104, however each of the data receiver 124, mapping tool 126, and detector 128 operates in agreement across network 106.

The data receiver 124 may receive data from a number of moving objects 130 using sensors attached to each moving object 130. The space in which the moving objects 130 exist can be divided into a number of segments 132. The sensors attached to each moving object 130 may relay a position report to the server 102. The position report may indicate the segment on which the moving object is, the speed of the moving object, and other data relating to the moving object.

The system 100 may include any number of moving objects 130. For example, the system may include a single moving object or several thousand moving objects. The sensors attached to the moving objects 130 may be considered dynamic sensors, as data associated with the moving objects 130 can change relatively often over time. For example, if moving objects 130 are vehicles or aircraft, data such as speed and location can change often over time.

A segment can be defined as a portion of the system in which moving objects exist, such as a roadway or airspace. For example, the moving object may be a vehicle and the segment may be a roadway, or the moving object may be an aircraft and the segment may be a defined amount of airspace. The data receiver 124 may also receive data for a particular segment 132 using data from a particular moving object 130 that is located within the particular segment 132. For each segment 132 an average velocity may be computed. Further, the data corresponding to each segment 132 can be gathered from static sensors, since the segments 132 may change slowly with time. Continuing with the previous example, a segment may be a highway on which vehicles travel, or a defined amount of airspace in which aircraft may travel. Very few data points, if any, change often with regards to the highway or airspace.

As discussed above, each moving object 130 may be fitted with a sensor that relays a data to the server 102 across the network 106. The data may also be relayed to the client computers 104 across the network 106. The data may be read from the sensors on the moving objects 130 at fixed time intervals using the data receiver 124.

The mapping tool 126 may map the sensor data from the dynamic sensors. During the mapping, statistics or quantities related to each segment may be computed from the dynamic sensor data, such as the average velocity of each segment. The detector 128 may detect events in real time based on the mapping, and provide online correlation in order to quickly determine any issues within the system. Events may be detected over both the dynamic sensors and the static sensors.

Figure 2:
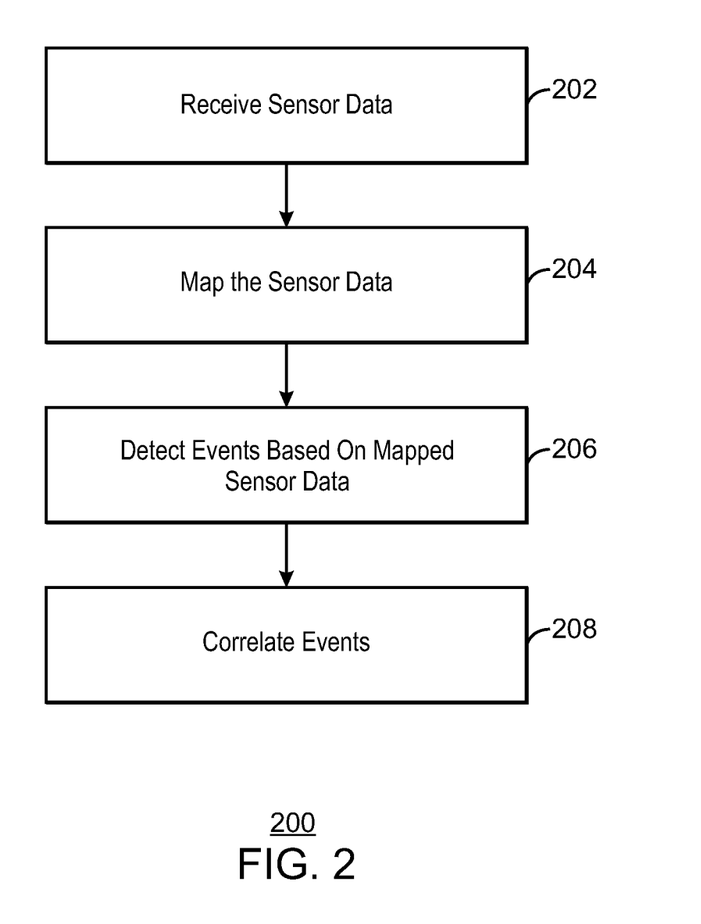
FIG. 2 is a process flow diagram of a method of detecting and correlating events from moving object sensor data according to an embodiment of the present techniques.

FIG. 2 is a process flow diagram of a method of detecting and correlating events from moving object sensor data according to an embodiment of the present techniques. At block 202, sensor data may be received from both the moving objects and the segments. The sensor readings may be received using the data receiver 124 (FIG. 1), and may be received as a continuous stream of data. Additionally, the sensor readings may be in the form of position reports. The position reports may contain data regarding a location for each moving object, which may be determined, for example, using a global positioning system (GPS).

At block 204, the sensor readings may be mapped in order to find static sensor anomalies and dynamic sensor anomalies. The data within the position reports may be used to map sensor data received from the dynamic sensors. Mapping may include computing quantities related to each moving object and each segment from the data received across a network using a server such as server 102 (FIG. 1). The quantities computed may be related to each moving object and each segment, such as the latest average velocity of moving objects within each segment, the number of moving objects for each segment, and the velocity of each object, among other quantities. The quantities computed from the data in the position reports may be computed at fixed intervals of time.

At block 206, events may be detected based on the mapped sensor data. Once the mapping has been used to compute quantities related to each moving object and each segment, events may be found. The types of events that may be detected based on mapped sensor data include skyline events, static sensor anomaly events, or dynamic sensor anomaly events. A skyline event is an event that may be detected when a segment has a high number of vehicles with a low velocity, which may indicate a congested segment.

A static sensor anomaly is an event that may be detected using static sensor data. Static sensor anomaly events may be described using an exponentially weighted moving average (EWMA) or Haar wavelets. When using an EWMA, the static sensor anomaly event may be computed based on the average number of moving objects over each segment and the average velocity over each segment as an individual time series, known as the EWMA. The EWMA may be used to compute anomalies over all segments. If the value EWMA deviates from an expected by more than a threshold amount, the EWMA can be considered anomalous. The threshold amount may correspond to a standard deviation that is more than two sigma away from the expected value of the EWMA.

Another static sensor anomaly event may correspond to anomalies at an instant of time across segments, for both the average velocity and the number of moving objects across each segment. This type of static sensor anomaly may be computed at various levels of abstractions for the segments. Haar wavelets may be used to find a set of coefficients, where each coefficient corresponds to an observation or a set of observations. For example the observation may be the average velocity or the number of moving objects across each segment. If the coefficient is greater than a threshold amount, then the observation or the set of observations is called anomalous. Further, the Haar wavelets may be modified so that they can be used over non-dyadic hierarchies. Thus, the present innovation is not limited to sensor data that is dyadic. For example, multiple highways may be used when considering anomalies at an instant of time using average velocity and the number of moving objects for the segments.

A dynamic sensor anomaly is an event that may be detected using dynamic sensor data. Accordingly, dynamic sensor anomaly events are tied to a moving object. Moving objects may come in and out of the system or network, and the dynamic sensor data may be used to express the relationship among these dynamic sensors. Dynamic sensor anomaly events may be detected over the dynamic sensor data by using an efficient indexing scheme over the dynamic sensor data in order to detect any anomalies over the large number of data points within the streaming data.

The skyline events, static sensor anomaly events, or dynamic sensor anomaly events may be detected at various levels of abstraction, such as at one segment or across multiple segments. Additionally, rules may be discovered after the events have been detected that correspond to the detected events. As a result, the present innovation may be used discover rules within the system for use in other applications.

At block 208, events may be correlated online. Event correlation is achieved by using a tree data structure called a hierarchical neighborhood tree (HNT). Each node of the HNT corresponds to a segment. Moving objects are represented through their association with one node of the HNT at a particular instant of time. For example, if there is an event from Moving Object 1 when it is located within Segment S, then the event from Moving Object 1 is marked to have occurred at Segment S in the HNT.

The leaf nodes of the HNT may represent the smallest grouping of segments, while the non-leaf nodes may represent larger groups of segments, or higher levels of abstraction. Thus, the edges of the HNT signify a parent-child relationship between two groupings of segments. For example, the leaf nodes may correspond to one segment of highway one mile in length. The first level nodes above the leaf nodes of the tree may correspond to ten miles of highway, having one first level node being a parent node to ten leaf nodes. Similarly, the second level of nodes above the leaf nodes of the tree may correspond to hundreds of miles of highway, depending on the corresponding child nodes.

A correlation may be defined as two different types of events occurring in any hierarchical neighborhood within a fixed interval of time. The events may be correlated online, in real time. Through event correlation, an operator of the system may obtain insight into the relationships among various events within the system. The tree may be used to store the events corresponding to various segments, and can be used to compute correlations based on the distance between each event.

Figure 3:
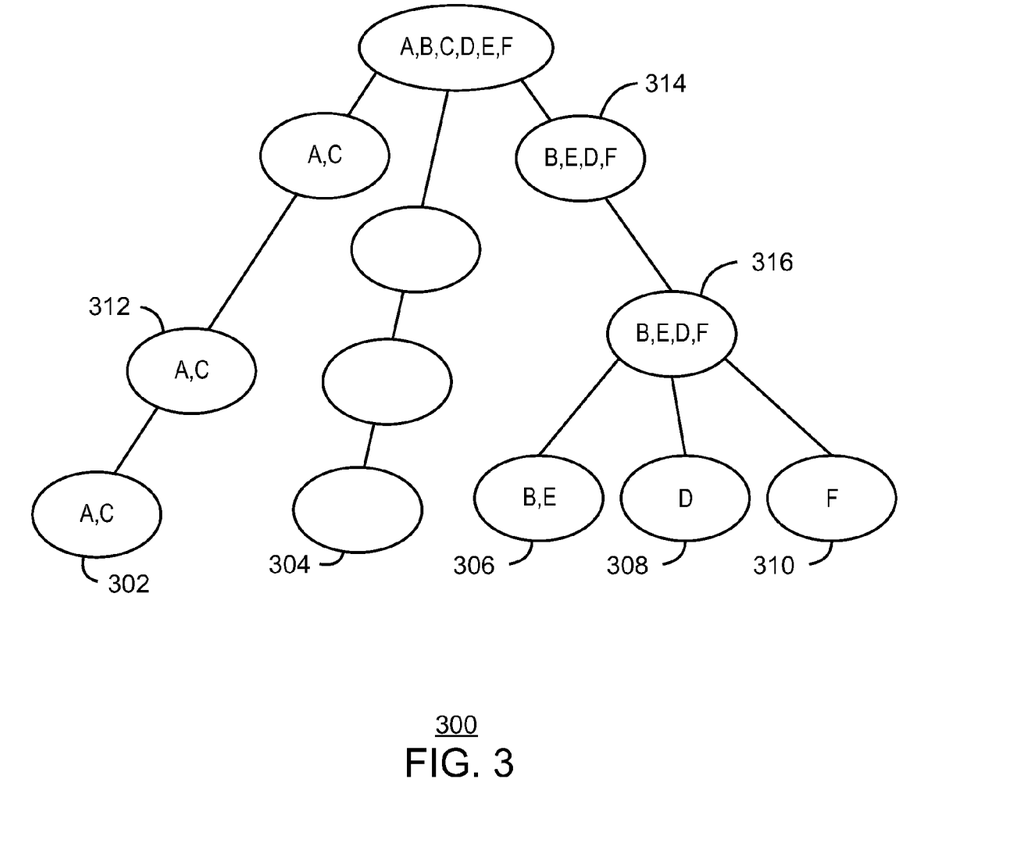
FIG. 3 is a tree diagram showing a hierarchical neighborhood tree according to an embodiment of the present techniques.

FIG. 3 is a tree diagram showing a hierarchical neighborhood tree 300 according to an embodiment of the present techniques. Suppose multiple events denoted A, B, C, D, E, and F are detected based on the mapped sensor data. Each event has an associated location, and each location can be placed in the HNT. Each of the nodes may represent a segment. Accordingly, there are leaf nodes at reference numbers 302, 304, 306, 308, and 310. The first level of nodes above the leaf nodes in the HNT 300 may represent ten segments, such as the node at reference number 312. Similarly, the second level of nodes above the leaf nodes in the HNT 300 may represent hundreds of segments, such as the node at reference number 314.

The events may occur at some node within the HNT 300. Based on the HNT 300, correlations between the events A, B, C, D, E, and F may be found in the tree by noting their location within the HNT 300. For example, events A and C occur at the same node, meaning they occur within same segment, at reference number 302. Events A and C are said to be correlated. Similarly, events B and E occur in the same leaf node at reference number 306 and are correlated. Events B, D, E, and F occur in the child nodes of the sub-tree rooted at the parent node at reference number 316. Thus, events B, D, E, and F are said to be correlated. However, the strength of correlation between events B, D, E, and F is less than the strength of correlation between events A and C or the strength of correlation between events B and E. This is a result of the events B, D, E, and F occurring across multiple nodes, while events A and C, and events B and E occur within the same node. Through the correlations, an operator of the system may obtain real-time insight into the status of the system 100.

Figure 4:
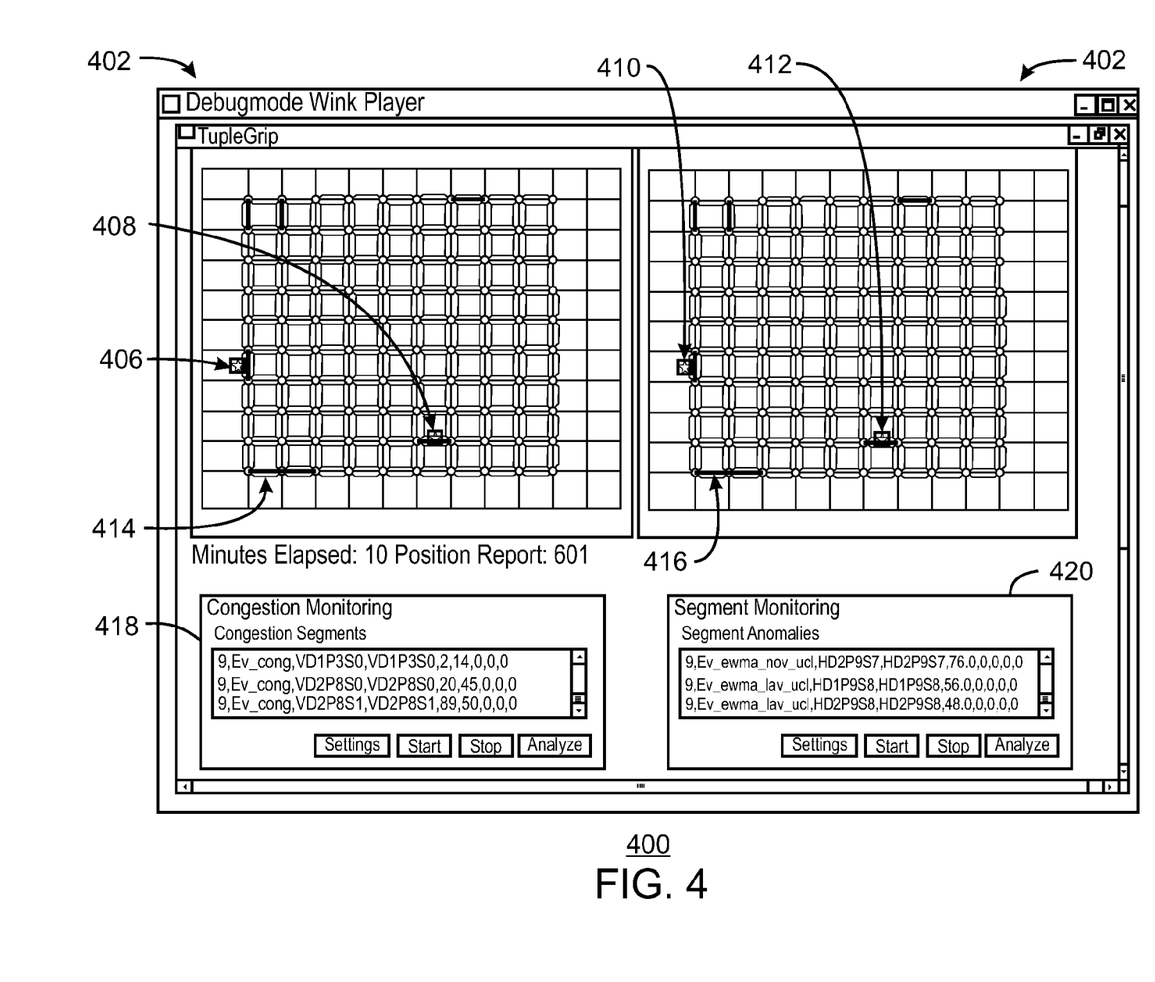
FIG. 4 is a screen shot of latest average velocity and number of vehicle values for a set of highways at an instant of time according to an embodiment of the present techniques.

FIG. 4 is a screen shot 400 of latest average velocity (LAV) and number of vehicles (NOV) for a set of highways at some instant of time according to an embodiment of the present techniques. In FIG. 4, the moving objects correspond to vehicles, and the segments correspond to highways. The screen shot shows two grids, a grid 402 and a grid 404 which simulates a ten by ten mile of road grid.

The grid 402 displays LAV, while the grid 404 displays NOV. The velocity and number of vehicles may be updated at a fixed time interval, such as once every minute. The grid 402 shows accidents at reference numbers 406 and 408. Similarly, the grid 404 shows accidents at reference numbers 410 and 412. Congested sections of the grids may be shown by black segments, such as segments 414 and 416. Both segments 414 and 416 show skyline events. The Congestion Monitoring Box at reference number 418 displays those segments that include a skyline event. Similarly, the Segment Monitoring Box at reference number 420 displays those events that have an EWMA outside of a pre-defined threshold, or static anomaly events.

Figure 5:
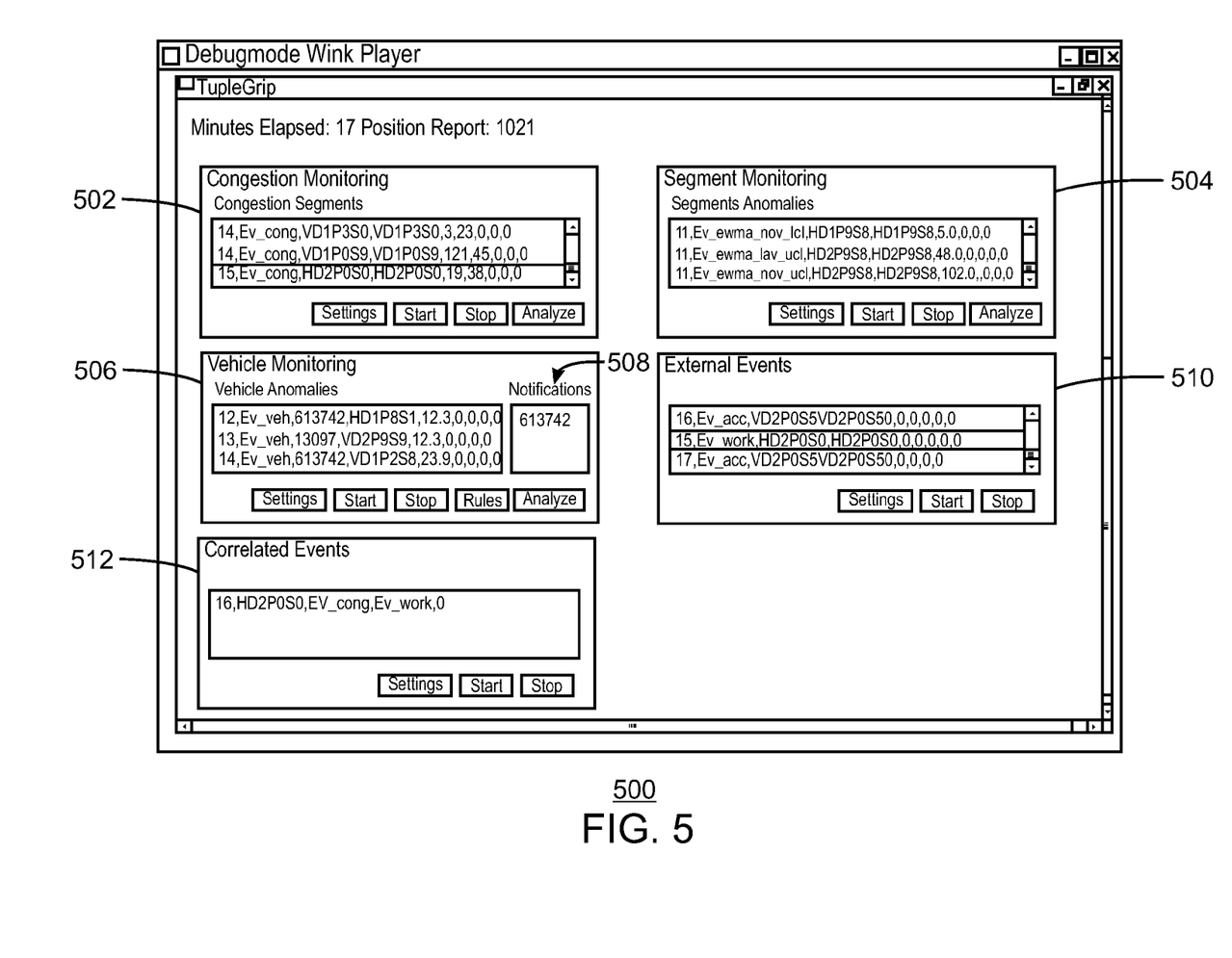
FIG. 5 is a screen shot of various event processing output displays according to an embodiment of the present techniques.

FIG. 5 is a screen shot of various event processing output displays according to an embodiment of the present techniques. At reference number 502, congested segments at a particular instant of time are displayed. Likewise, at reference number 504, the static events detected are displayed.

At reference number 506, dynamic sensor data from moving objects are rendered as events. At reference number 508, notifications are displayed. The notifications may be issued when a moving object is involved in more than one event.

At reference number 510, external events are displayed. External events may include events that are reported from an external source and not detected by the event detection and correlation system.

At reference number 512, the correlated events are rendered in real time. The correlations may be obtained from the HNT, as described herein.

Figure 6:
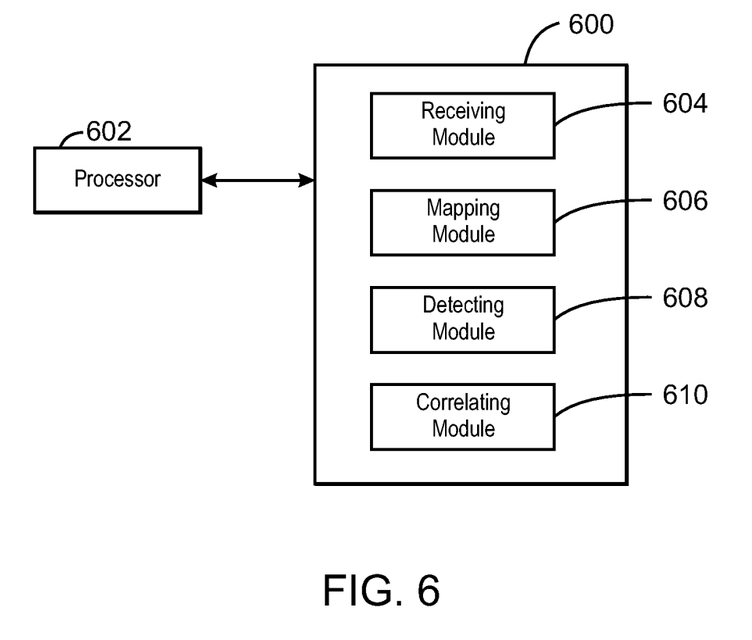
FIG. 6 is a block diagram showing a non-transitory, computer-readable medium that stores code for detecting and correlating events from moving object sensor data according to an embodiment of the present techniques.

FIG. 6 is a block diagram showing a non-transitory, computer-readable medium that stores code for event detection and correlation from moving object sensor data according to an embodiment of the present techniques. The non-transitory, computer-readable medium is generally referred to by the reference number 600.

The non-transitory, computer-readable medium 600 may correspond to any typical storage device that stores computer-implemented instructions, such as programming code or the like. For example, the non-transitory, computer-readable medium 600 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 602 generally retrieves and executes the computer-implemented instructions stored in the non-transitory, computer-readable medium 600 for event detection and correlation from moving object sensor data. At block 604, a receiving module may receive data from a sensor located on a moving object. At block 606, a mapping module may map data received from the receiving module. At block 608, a detecting module may detect events based on the mapped sensor data from the mapping module. The events may be skyline events, static sensor anomalies, or dynamic sensor anomalies. At block 610, a correlating module may correlate the events from the detecting module.

What is claimed is:

1. A system for event detection and correlation from moving object sensor data, the system comprising:
   a processor that is adapted to execute stored instructions; and
   a memory device that stores instructions, the memory device comprising processor-executable code, that when executed by the processor, is adapted to:
   receive data from a sensor attached to a moving object;
   map the data received from the sensor;
   detect events based on the mapped sensor data; and
   correlate the events online using a hierarchical neighborhood tree (HNT) data structure, wherein a leaf node of the HNT data structure represents at least one segment, wherein a plurality of leaf nodes of the HNT data structure represents a smallest grouping of segments and a plurality of non-leaf nodes represents a larger grouping of segments, and wherein the HNT data structure computes correlations based on the distance between each event.

2. The system recited in claim 1, wherein a level of nodes above the leaf node represents a plurality of nodes.

3. The system recited in claim 1, wherein the memory device includes processor-executable code adapted to map the data received from the sensor by computing quantities related to each moving object and each segment from the data received across a network.

4. The system recited in claim 1, wherein the memory device includes processor-executable code adapted to detect events based on the mapped sensor data, the events including skyline events, static sensor anomaly events, or dynamic sensor anomaly events.

5. The system recited in claim 1, wherein the memory device includes processor-executable code adapted to detect events based on the mapped sensor data by discovering rules corresponding to the events.

6. The system recited in claim 1, wherein a static sensor anomaly event is described using an exponentially weighted moving average or Haar wavelets.

7. The system recited in claim 1, wherein the moving object is a vehicle and the segment is a roadway, or the moving object is an aircraft and the segment is a defined amount of airspace.

8. A method of event detection and correlation from moving object sensor data, the method comprising:
- receiving data from a sensor;
- mapping the data received from the sensor;
- detecting events based on the mapped sensor data; and
- correlating the events online using a hierarchical neighborhood tree (HNT) data structure, wherein a leaf node of the HNT data structure represents at least one segment, wherein a plurality of leaf nodes of the HNT data structure represents a smallest grouping of segments and a plurality of non-leaf nodes represents a larger grouping of segments, and wherein the HNT data structure computes correlations based on the distance between each event.

9. The method recited in claim 8, wherein a level of nodes above the leaf node represents a plurality of nodes.

10. The method recited in claim 8, wherein receiving data from a sensor includes receiving a position report from a sensor across a network.

11. The method recited in claim 8, comprising detecting events based on the mapped sensor data at various levels of abstraction or across multiple segments.

12. The method recited in claim 8, wherein detecting events based on the mapped sensor data includes detecting static anomaly events, dynamic sensor anomaly events, or skyline events based on the mapped sensor data.

13. The method recited in claim 8, wherein a static sensor anomaly event is described using an exponentially weighted moving average or Haar wavelets.

14. The method recited in claim 8, wherein a dynamic sensor anomaly event is detected by using an efficient indexing scheme over dynamic sensor data.

15. A non-transitory, computer-readable medium, comprising code configured to direct a processor to:
- receive data from a sensor;
- map the data received from the sensor;
- detect events based on the mapped sensor data; and
- correlate the events online using a hierarchical neighborhood tree (HNT), wherein the correlation of events is based on a distance between each event, wherein the HNT comprises nodes that correspond to segments, wherein a leaf node represents at least one segment, and wherein a plurality of leaf nodes of the hierarchical neighborhood tree (HNT) represents a smallest grouping of segments and a plurality of non-leaf nodes represents a largest grouping of segments.

16. The non-transitory, computer-readable medium recited in claim 15, wherein receiving data from a sensor includes receiving a position report from a sensor across a network.

17. The non-transitory, computer readable medium recited in claim 15, wherein detecting events based on the mapped sensor data includes detecting static sensor anomaly events, dynamic sensor anomaly events, or skyline events based on the mapped sensor data.

18. The non-transitory, computer-readable medium recited in claim 15, wherein a static sensor anomaly event is described using an exponentially weighted moving average or Haar wavelets.

19. The non-transitory, computer-readable medium recited in claim 15, comprising discovering rules corresponding to the events after the events are detected.

20. The method of claim 1, wherein the segment is a portion of an environment in which the moving object is located.

21. The method of claim 20, wherein the segment is a roadway and the moving object is a vehicle.

22. The method of claim 20, wherein the data associated with the segment is received from sensors located in the portion of the environment.

* * * * *

UNITED STATES PATENT AND TRADEMARK OFFICE
CERTIFICATE OF CORRECTION

| | | |
|---|---|---|
| PATENT NO. | : 9,262,294 B2 | |
| APPLICATION NO. | : 13/285825 | |
| DATED | : February 16, 2016 | |
| INVENTOR(S) | : Chetan Kumar Gupta et al. | |

It is certified that error appears in the above-identified patent and that said Letters Patent is hereby corrected as shown below:

In the Claims

In column 08, line 29, in Claim 17, delete "computer readable" and insert -- computer-readable --, therefor.

Signed and Sealed this
Fourteenth Day of June, 2016

Michelle K. Lee
*Director of the United States Patent and Trademark Office*